UNITED STATES PATENT OFFICE.

ISIDORE RESSLER, OF DETROIT, MICHIGAN.

DEODORANT AND DISINFECTANT COMPOUND.

1,408,535. Specification of Letters Patent. Patented Mar. 7, 1922.

No Drawing. Application filed May 19, 1919. Serial No. 298,033.

*To all whom it may concern:*

Be it known that I, ISIDORE RESSLER, a subject of the King of Great Britain, residing at Detroit, in the county of Wayne and State of Michigan, have invented certain new and useful Improvements in Deodorant and Disinfectant Compounds, of which the following is a specification.

This invention relates to a deodorant and disinfectant compound, and the primary object of my invention is to provide a compound which is either in powdered or cake form and may be advantageously used in the urinals, bowls and other receptacles of toilets as a deodorant, and also as a disinfectant, and the compound in its cake form and with a suitable perfumery agent may be utilized for other purposes.

Another object of my invention is to provide a deodorizing compound having as an essential ingredient plaster Paris, porous concrete or any plastic material which will hold in suspension a perfuming agent. It is preferable to use material for a body which may be molded and which will gradually dissolve or waste away under the action of water or other liquid and thus release the perfumery held in suspension thereby. It is therefore possible to prepare the disinfectant in the form of a cake or block which may be placed in a urinal to deodorize and disinfect the same, without any danger of the cake or block being immediately dissolved and destroyed.

A further object of my invention is to provide a compound in which various perfuming agents may be placed and combined so as to produce an odor which will predominate all other odors, and by combining different perfumes it is possible to vary the proportions thereof so that the cakes of the compound may be prepared to suit the fancy of different users of the compound.

In preparing the compound to produce a dozen cakes of eight ounces each, I use the following ingredients in approximately the proportion herein stated.

| | |
|---|---|
| Plaster Paris | 10 pounds |
| Formaldehyde | 6 ounces |
| Chlorinated lime | 8 ounces |
| Oil of eucalyptus | 12 ounces |
| Oil of thyme | 6 ounces |
| Oil of lavender | 4 ounces |
| Water | 5 pints |
| Salt | 6 ounces |

The plaster Paris is in powdered form and as a substitute therefor I may use any solvent plastic material that can be easily molded into cakes or small blocks.

The oils of eucalyptus, thyme, and lavender are used as perfumery or deodorants, the formaldehyde and lime as disinfectants, and the salt as a hardening agent.

The plaster Paris forms the body of the compound and since it is in powdered form the formaldehyde, lime and salt can be readily mixed in the body of plaster Paris.

The deodorizing oils can be mixed together and with the water added to the plaster Paris so as to make a plastic body, which when placed in suitable molds will immediately set and harden.

In mixing the oils with the plaster Paris, formaldehyde, lime and salt, the fine particles of these ingredients become coated with the oils, and when the mixture is molded, it is obvious that only the exposed surfaces of the cake or block may liberate odors, while those particles of the oil retained within the body of the cake or block will be held in suspension until the cake or block has its outer surfaces washed away or otherwise removed. When such a cake is used in a urinal it is continuously washed by the automatic flushing of the urinal and consequently particles of the deodorizing oils are released so that other odors that may exist about the urinal cannot be detected. Simultaneous with the release of particles of deodorizing oils there are also particles of the formaldehyde and lime released to enter the drain pipe of the urinal and disinfect the same.

The salt is not actually necessary as an ingredient, except where in the manufacture of the cakes it is desired to have the same quickly dried or seasoned, and portions of the deodorizing oils may be varied, so that one oil will predominate the other. It is therefore possible to manufacture the deodorant to suit a customer's taste, and I find that by placing the three oils in the compound in about the proportions stated, that it is often possible for one customer to detect one odor over the others, and thus feel satisfied that he is getting an article such as he desires.

What I claim is:—

A deodorant and disinfectant compound for urinals wherein running water is adapted to dissolve a compound placed in the urinal, such compound comprising a molded perishable body made of ten pounds of plaster Paris, six ounces of formaldehyde and eight ounces of chlorinated lime, said ingredients being compounded with twelve ounces of eucalyptus, six ounces of oil of thyme and four ounces oil of lavender, and which compound constantly exudes an odor and slowly washes away with the water passing through the urinal.

In witness whereof I affix my signature in the presence of two witnesses.

ISIDORE RESSLER.

Witnesses:
G. E. ALLORD,
KARL H. BUTLER.